US012208534B2

(12) United States Patent
Xu

(10) Patent No.: US 12,208,534 B2
(45) Date of Patent: Jan. 28, 2025

(54) DOUBLE-CAM FASTENER DRIVING MACHINE

(71) Applicant: Ying Xu, Dongguan (CN)

(72) Inventor: Ying Xu, Dongguan (CN)

(73) Assignee: Dongguan Good-Tech Design Consulting Co., Ltd., Dongguan (CN)

( * ) Notice: Subject to any disclaimer, the term of this patent is extended or adjusted under 35 U.S.C. 154(b) by 136 days.

(21) Appl. No.: 17/113,130

(22) Filed: Dec. 7, 2020

(65) Prior Publication Data

US 2022/0176584 A1 Jun. 9, 2022

(51) Int. Cl.
*B27F 7/05* (2006.01)
*B27F 7/13* (2006.01)

(52) U.S. Cl.
CPC . *B27F 7/05* (2013.01); *B27F 7/13* (2013.01)

(58) Field of Classification Search
CPC ..... B27F 7/05; B27F 7/13; B25C 1/06; B25C 1/04; F16H 2019/068; F16H 19/0622; F16H 19/02
USPC ........................................ 227/129, 131, 136
See application file for complete search history.

(56) References Cited

U.S. PATENT DOCUMENTS 4,558,747 A * 12/1985 Cunningham ............ B25C 1/06 173/124
7,815,088 B2 * 10/2010 Fielitz ....................... B25C 5/15 227/129
8,047,415 B2 * 11/2011 Kunz ........................ B25C 1/06 227/129
8,393,512 B2 * 3/2013 Tanimoto .................. B25C 1/06 227/129
10,195,727 B2 * 2/2019 Ricordi ...................... B25C 1/06
2004/0169058 A1 * 9/2004 Mochizuki ................ B27F 7/36 227/131
2009/0294508 A1 * 12/2009 Kunz ........................ B25C 1/06 310/74
2010/0065294 A1 * 3/2010 Hirabayashi .............. B25C 1/06 173/122
2010/0102104 A1 * 4/2010 Tanimoto .................. B25C 1/06 173/178
2012/0211540 A1 * 8/2012 Kondou .................... B25C 1/00 227/140

* cited by examiner

*Primary Examiner* — Veronica Martin

(57) ABSTRACT

A double-cam fastener driving machine, including an energy storage unit; an impact unit for actuating the energy storage unit to store energy which can bear the energy released from the energy storage unit to drive the fastener into the workpiece; a rotating actuating unit; a pushing mechanism; a double-cam mechanism, comprising a first cam and a second cam which can be optionally engaged and disengaged, the first cam is connected to the rotating actuating unit and driven by the rotating actuating unit to rotate, the second cam is connected and linked with the pushing mechanism. The double-cam mechanism to implement engagement and disengagement of rotating actuating unit and pushing mechanism, and the impact unit is not disengaged from the pushing mechanism, so that the double-cam mechanism can be engaged correctly during quick release, normal nailing or nail jamming of impact unit.

8 Claims, 6 Drawing Sheets

DOUBLE-CAM FASTENER DRIVING MACHINE

BACKGROUND OF INVENTION

1. Field of the Invention

The present invention relates generally to the technical field of machine tool products, and more particularly to a double-cam fastener driving machine.

2. Description of Related Art

In a quick fastening machine (also known as nailing gun or fastener driving machine), the energy storage unit (e.g. gas, compression spring, rubber, vacuum) is usually compressed or pulled to store energy, and then the energy is released quickly to apply work to the outside.

The quick fastening machine of the existing technology generally uses incomplete gear-rack structure as pushing mechanism to drive the impact unit to compress the energy storage unit, so as to store energy. When the energy storage unit releases energy to drive the impact unit to drive the fastener into the object, the pushing mechanism is disengaged from the impact unit, so that the pushing mechanism cannot engage with the impact unit correctly during quick release and nail jamming of impact unit, unfavorable for increasing the transmission efficiency, the time of working cycle is prolonged a lot, and the operational stability and smoothness of impact unit cannot be guaranteed.

In view of this, this inventor proposes the following technical proposal.

SUMMARY OF THE INVENTION

In view of the above disadvantages, the technical issue to be resolved by the present invention is to provide a double-cam fastener driving machine a double-cam fastener driving machine, including

- an energy storage unit;
- an impact unit for actuating the energy storage unit to store energy which can bear the energy released from the energy storage unit, so as to drive the fastener into the workpiece; a rotating actuating unit; a pushing mechanism, connected and linked with the impact unit;
- a double-cam mechanism, including a first cam and a second cam which can be optionally engaged and disengaged, the first cam is connected to the rotating actuating unit and driven by the rotating actuating unit to rotate, the second cam is connected and linked with the pushing mechanism.

More particularly, wherein the first cam and the second cam can engage with each other at a part of circumferential angle, the rotating motion of the first cam is transformed into the rotating motion of the second cam, and the rotation direction is opposite, the first cam and the second cam do not engage with each other at the other part of circumferential angle, so as to implement disengagement.

More particularly, wherein when the first cam engages with the second cam along the mating surface, the distance between the point of engagement and the spin axis of the first cam increases gradually, and the distance between the point of engagement and the spin axis of the second earn decreases gradually.

More particularly, wherein the rotating actuating unit includes a gear transmission module, a motor installed for the gear transmission module and a first output shaft installed on the gear transmission module for driving the first cam to rotate.

More particularly, wherein a clamp shaft is fixed to the first output shaft, the first cam is rotatably fitted over the first output shaft, and the first cam is provided with an arc chute, the end of the clamp shaft extends into the arc chute; the clamp shaft comprises a base and an axle body formed on one side of the base and normal to the base, the base is fixedly fitted over the first output shaft, the axle body vertically extends into the arc chute from top to bottom.

More particularly, wherein the second cam is fixed to the second output shaft; the pushing mechanism comprises a first pulley fixed to the second output shaft, a cord connected to the first pulley and several second pulleys for guiding, the cord to deflect, the end of the cord is connected to the impact unit through the second pulley.

More particularly, wherein the impact unit includes a piston arranged in the energy storage unit and a striker connected to the piston, the end of the cord of pushing mechanism is connected to the center of back end of the piston.

More particularly, wherein the piston is arranged in the cylinder body, and the periphery of the piston hermetically contacts the inside of cylinder body; the energy storage unit is located between the piston and cylinder body, the back end of the cylinder body is provided with a hole site (111) for the cord to pass through.

More particularly, wherein the energy storage unit and rotating actuating unit are fixed to the base, the upper and lower ends of the first output shaft are installed on base through the first bearing and the second bearing respectively, the upper and lower ends of the second output shaft are installed on the base through the third bearing and the fourth bearing respectively, a first bulge and a second bulge are formed at the front end of upper part of the base, the first bearing and the third bearing are installed in the first bulge and the second bulge respectively.

More particularly, including a nail guide plate and a nail clip arranged at the lower end of the nail guide plate for delivering fasteners to the nail guide plate, the nail guide plate has a channel for the striker of impact unit to pass through.

DETAILED DESCRIPTION OF THE INVENTION

Figure 1:
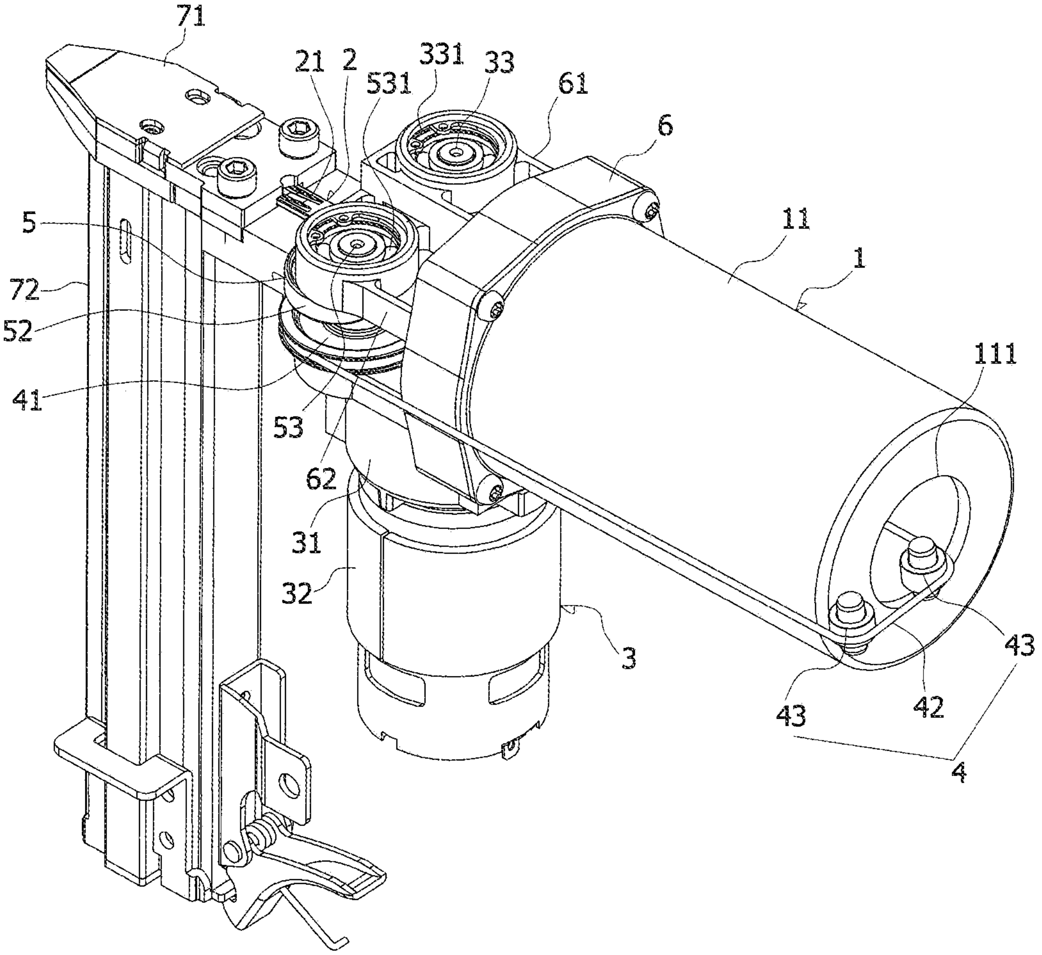
FIG. 1 is the stereogram of the present invention.
Figure 2:
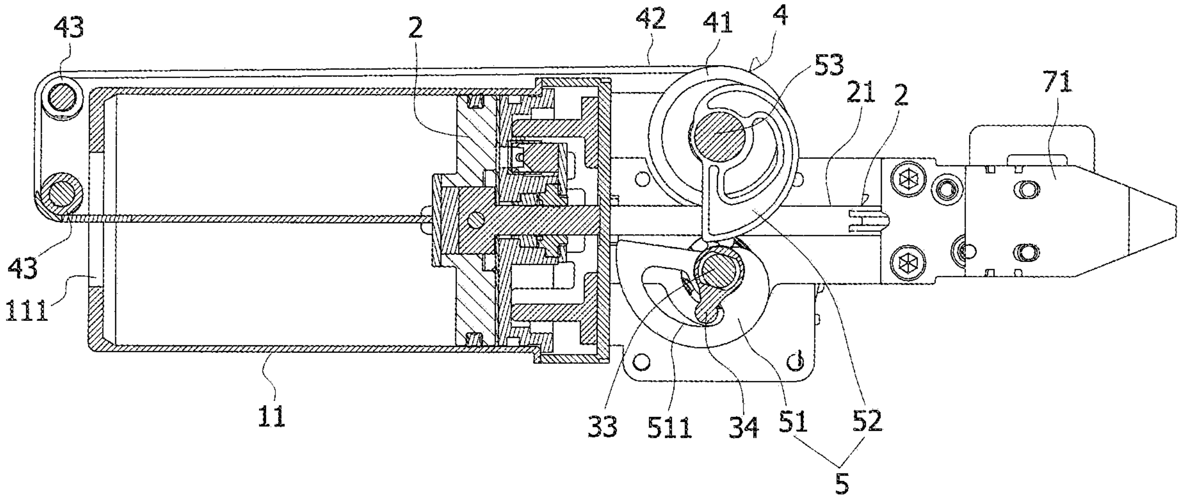
FIG. 2 is the sectional view of the present invention.
Figure 3:
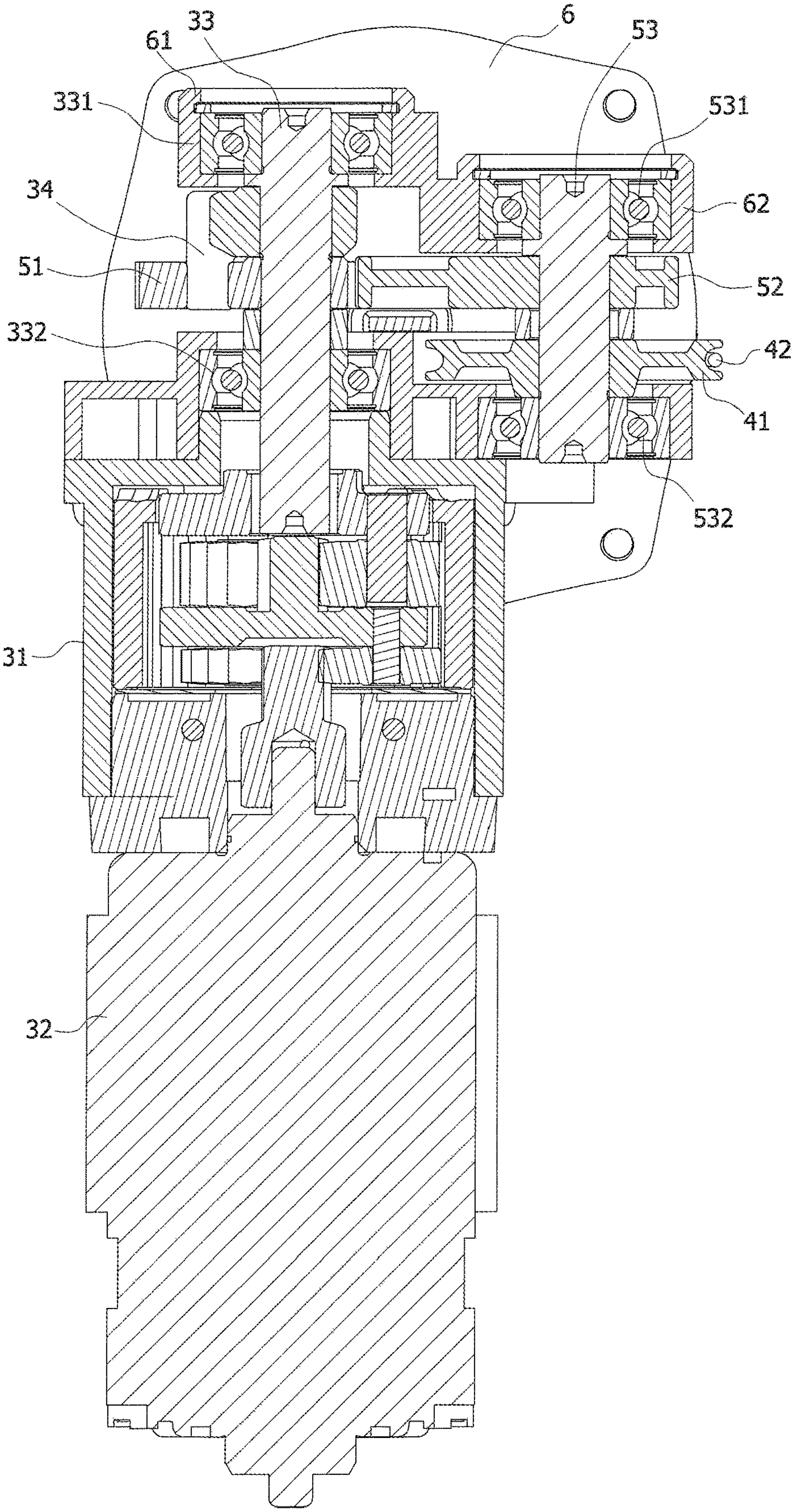
FIG. 3 is the sectional view from another viewing angle of the present invention.
Figure 4:
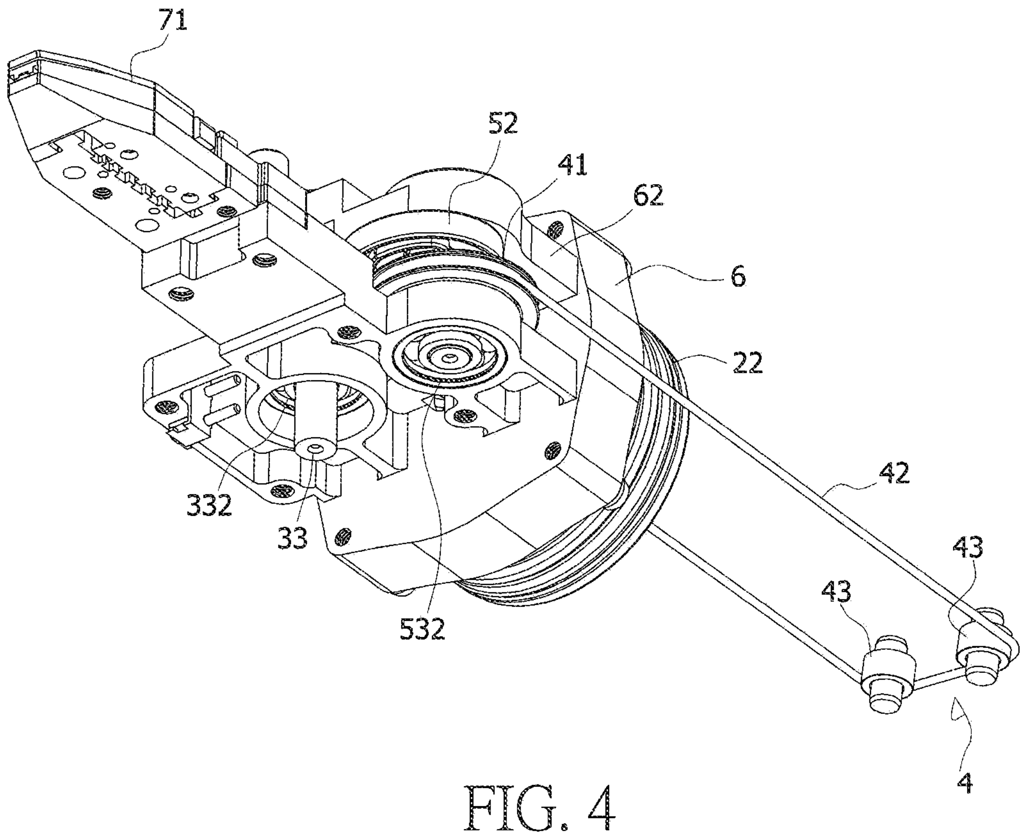
FIG. 4 is the internal structure diagram of the present invention.
Figure 5:
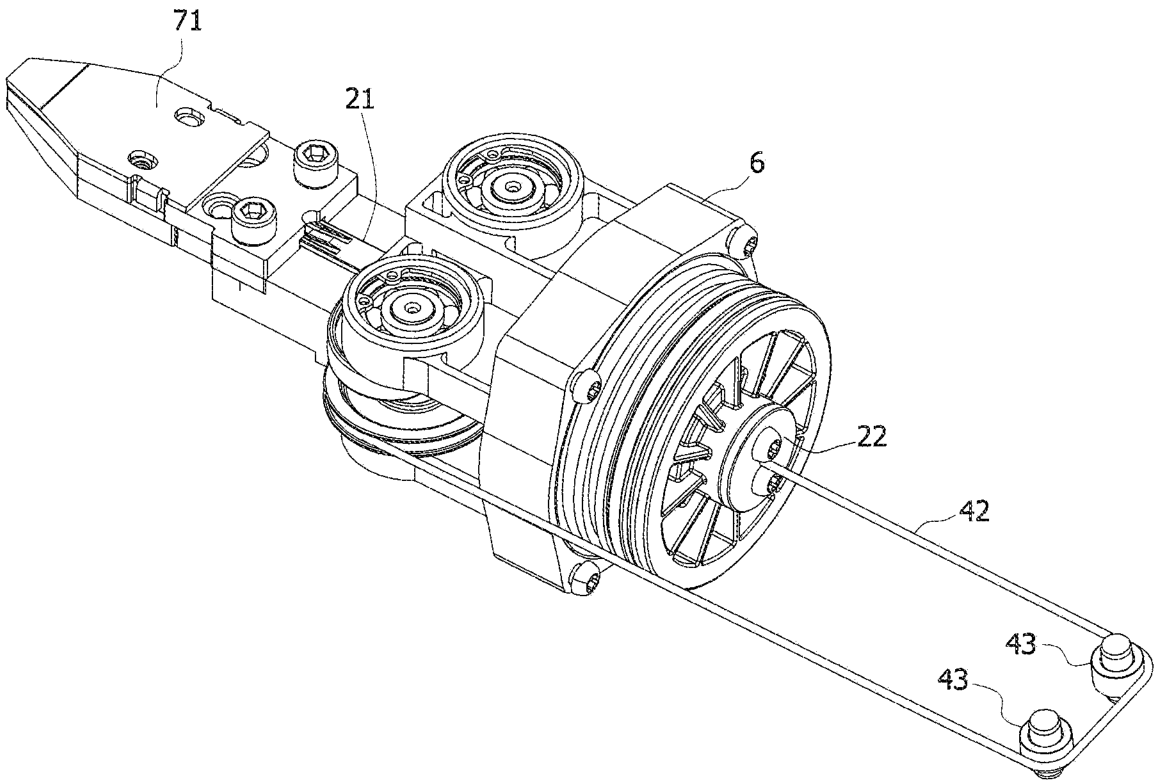
FIG. 5 is the internal structure diagram from another viewing angle of the present invention.
Figure 6:
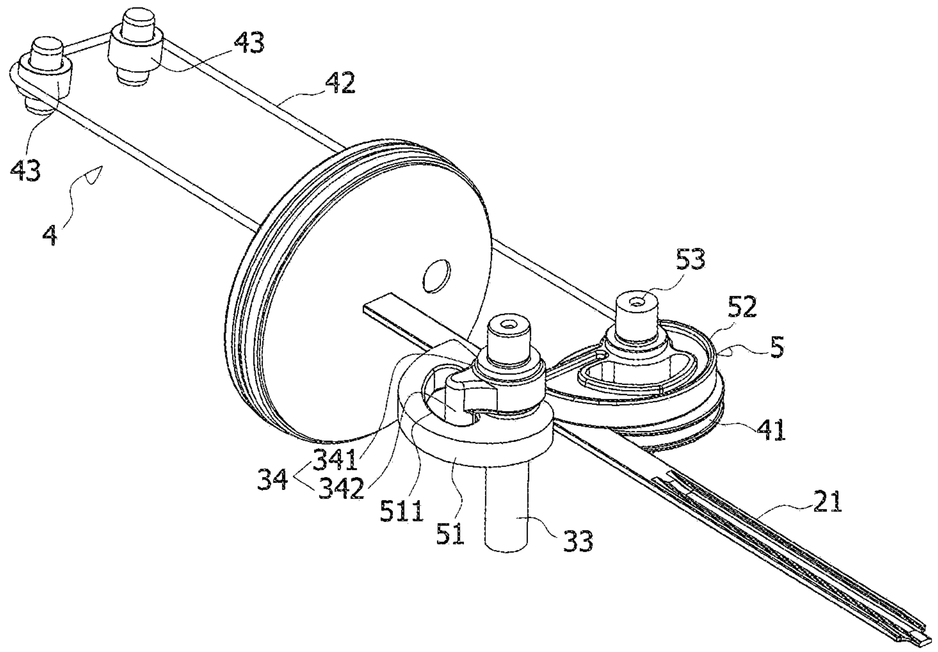
FIG. 6 is the assembly drawing of pushing mechanism, impact unit and double-cam mechanism in the present invention.
Figure 7:
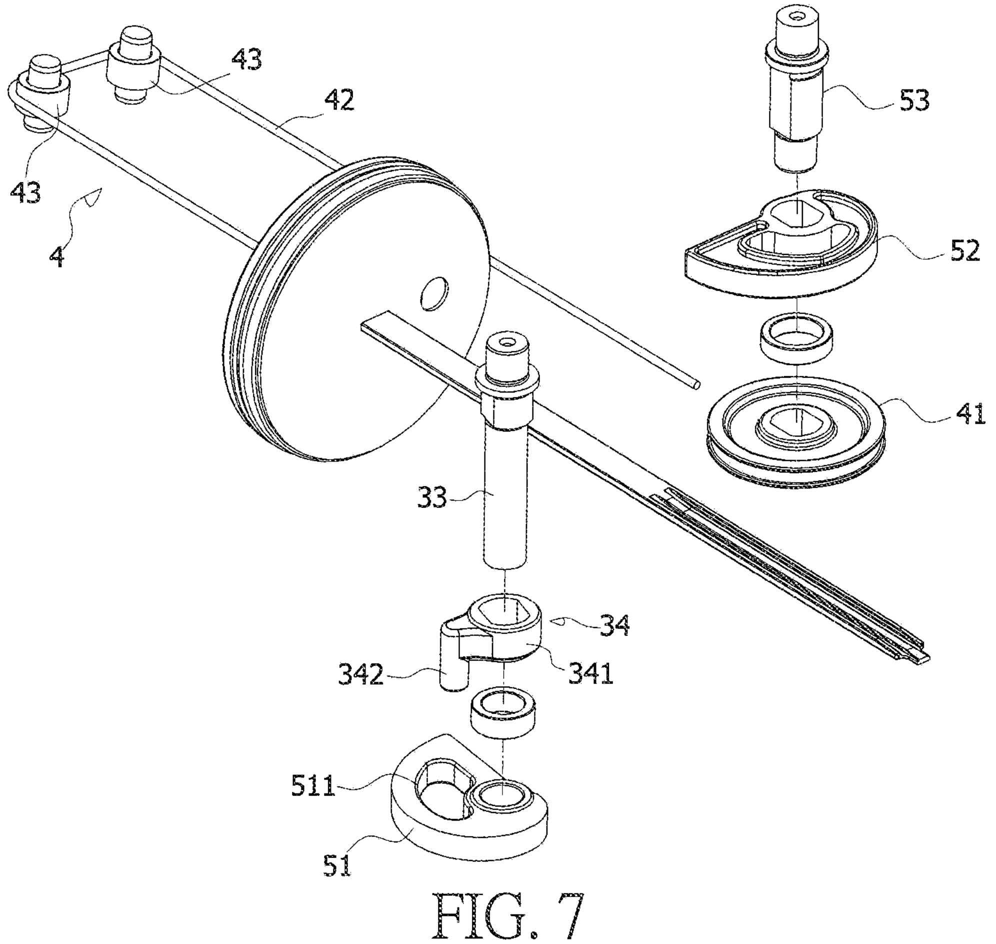
FIG. 7 is the exploded diagram of FIG. 6.

Described with attached figures below.

FIGS. 1-9 show a double-cam fastener driving machine, including an energy storage unit 1; an impact unit 2 for actuating the energy storage unit 1 to store energy which can bear the energy released from energy storage unit 1, so as to drive the fastener into the workpiece; a rotating actuating unit 3; a pushing mechanism 4, which is connected and linked with the impact unit 2; a double-cam mechanism 5, including a first cam 51 and a second cam 52 which can be optionally engaged and disengaged, the first cam 51 is connected to the rotating actuating unit 3 and driven by the rotating actuating unit 3 to rotate, the second cam 52 is connected and linked with the pushing mechanism 4. In the operation of the present invention, the rotating actuating unit 3 drives the first cam 51 to rotate. When the first cam 51 engages with the second cam 52, the second cam 52 is driven to rotate, and the pushing mechanism 4 is actuated to drive the impact unit 2 to actuate the energy storage unit 1 to store energy. When the first cam 51 has rotated to the second cam 52 in non-engaged state, the second cam 52 cannot provide power for the pushing mechanism 4 anymore, the impact unit rushes out under the effect of the energy released from the energy storage unit, so as to drive the fastener into the workpiece, and the pushing mechanism 4 and the second cam 52 work together with the impact unit, which is to say, the pushing mechanism 4 is not disengaged from the impact unit 2 at all, and the first cam 51 and the second cam 52 are optionally engaged and disengaged to drive the pushing mechanism, so that the double-cam mechanism can be engaged correctly during quick release, normal nailing or nail jamming of impact unit, the transmission efficiency is increased, and the quick release of impact unit is implemented, the operational stability and smoothness of impact unit are guaranteed, the work quality is upgraded, so the present invention has very strong marketability.

The energy storage unit 1 is a medium which can implement energy storage by changing displacement, such as air spring, mechanical spring, rubber element, vacuum and so on.

When the double-cam mechanism 5 is in engaged state, the pushing mechanism 4 can drive the impact unit to move in the first direction, so that the energy storage unit stores energy. When the double-cam mechanism 5 is in non-engaged state, the pushing mechanism 4 and the second cam 52 move in the second direction together with the impact unit under the effect of energy storage unit, so as to drive the fastener. The first direction refers to the impact unit 2 to energy storage unit 1 direction, and the second direction refers to the energy storage unit 1 to impact unit 2 direction. The first direction and the second direction can be defined in the following ways. When the first cam engages with the second cam, the motor output torsion pushes the impact unit to move leftwards through the gear transmission module, the first output shaft, the first cam, the second cam and the pushing mechanism, so that the energy storage unit 1 generates vacuum to store energy, this direction of movement of impact unit is defined as the first direction. When the first cam is disengaged from the second cam, i.e. non-engaged state, the energy storage unit I releases energy to drive the impact unit to move towards the nail guide plate 71, the fastener is driven from the nail guide plate into the workpiece, this direction of movement is defined as the second direction.

The first cam 51 and the second cam 52 can engage with each other at a part of circumferential angle, the rotating motion of the first cam 51 is transformed into the rotating motion of the second cam 52, and the rotation direction is opposite. The first cam 51 and the second cam 52 do not engage with each other at the other part of circumferential angle, so as to implement disengagement. Wherein when the first cam 51 engages with the second cam 52 along the mating surface, the distance between the point of engagement and the spin axis of the first cam 51 increases gradually, and the distance between the point of engagement and the spin axis of the second cam 52 decreases gradually.

The mating surface of the first cam 51 can be set as an involute surface. The mating surface of the second cam 52 can be set as an involute surface. Certainly, the mating surface of the first cam 51 and the mating surface of the second cam 52 can be set as other shapes, as long as the same technical effect can be achieved. Wherein the mating surfaces of the first cam 51 and the second cam 52 are set as involute surfaces, so that the arm of pressure between the first cam 51 and the second cam 52 is constant, and the relative movement along the common normal surface of two involute surfaces can be regarded as pure rolling, so as to increase the rotational efficiency.

The rotating actuating unit 3 comprises a gear transmission module 31, a motor 32 installed for the gear transmission module 31 and a first output shaft 33 installed on the gear transmission module 31 for driving the first cam to rotate. The motor 32 provides torsion and speed. The gear transmission module 31 uses one-layer or multilayer planetary gear transmission. This embodiment uses three-layer planetary gear transmission for reducing speed and increasing torsion. A clamp shaft 34 is fixed to the first output shaft 33. The first cam 51 is rotatably fitted over the first output shaft 33, and the first cam 51 is provided with an arc chute 511, the end of the clamp shaft 34 extends into the arc chute 511. The output of motor 32 is transferred through the gear transmission module 31 to the first output shaft 33. Both ends of the first output shaft 33 are supported by the first and second bearings. The first cam 51 is located between the first and second bearings. The clamp shaft is installed on the first output shaft, rotating with the first output shaft 33, and transmitting torque to the first cam 51, so as to drive the first cam 51 to rotate. When the first output shaft 33 rotates counterclockwise, the first cam 51 rotates counterclockwise as driven by the clamp shaft 34.

The clamp shaft 34 comprises a base 341 and an axle body 342 molded on one side of the base 341 and normal to the base 341. The base 341 is fixedly fitted over the first output shaft 33. The axle body 342 vertically extends into the arc chute 511 from top to bottom.

The second cam 52 is fixed to the second output shaft 53. The pushing mechanism 4 comprises a first pulley 41 fixed to the second output shaft 53, a cord 42 connected to the first pulley 41 and several second pulleys 43 for guiding the cord 42 to deflect. The end of the cord 42 is connected to the impact unit 2 through the second pulley 43. The first pulley 41 rotates along with the second output shaft 53.

The impact unit 2 comprises a piston 22 disposed in the energy storage unit 1 and a striker 21 connected to the piston 22. The end of the cord 42 is connected to the back end center of the piston 22.

The piston 22 is disposed in a cylinder body 11, and the periphery of the piston 22 hermetically contacts the inside of cylinder body 11. The energy storage unit 1 is vacuum. The energy storage unit 1 is located between piston 22 and cylinder body 11. The back end of the cylinder body 11 is provided with a hole site 111 for the cord 42 to pass through. The energy storage unit 1 and rotating actuating unit 3 are fixed to the base 6. At the beginning, the piston adheres to the end face of base 6, when the piston 22 moves back for a distance, as there is no gas supply, the confined space formed among the cylinder body, piston and base 6 will be vacuum (i.e. energy storage unit 1).

There are two of the second pulley 43, one second pulley is installed on the side of back end of cylinder body 11, the other second pulley is arranged at the hole site 111 of cylinder body 11, so that the end of cord 42 is connected to the center of back face of piston 22 through two second pulleys 43, and the end of cord 42 and the axis of piston 22 are in the same straight line, the cord 42 can pull the piston 22 to move inside the cylinder body, and it is the most laborsaving.

The upper and lower ends of the first output shaft 33 are installed on the base 6 through the first bearing 331 and the second bearing 332. The upper and lower ends of the second output shaft 53 are installed on base 6 through the third bearing 531 and the fourth bearing 532. A first bulge 61 and a second bulge 62 are formed at the front end of upper part of the base 6. The first bearing 331 and the third bearing 531 are installed in the first bulge 61 and the second bulge 62 respectively.

The present invention includes a nail guide plate 71 and a nail clip 72 arranged at the lower end of the nail guide plate 71 for delivering fasteners to the nail guide plate 71. The nail guide plate 71 has a channel for the striker 21 of impact unit 2 to pass through. The nail clip is a fastener loading device, delivering fasteners (e.g. nails) to the nail guide plate. The nail guide plate receives fasteners from the nail clip. When a fastener falls into the channel of nail guide plate, the striker 21 of the impact unit performs impact with the releasing capacity of energy storage unit 1, the striker 21 passes through the channel, and drives the fastener (e.g. nail) in the channel into the workpiece (generally wood, metal plate or cement).

Figure 8:
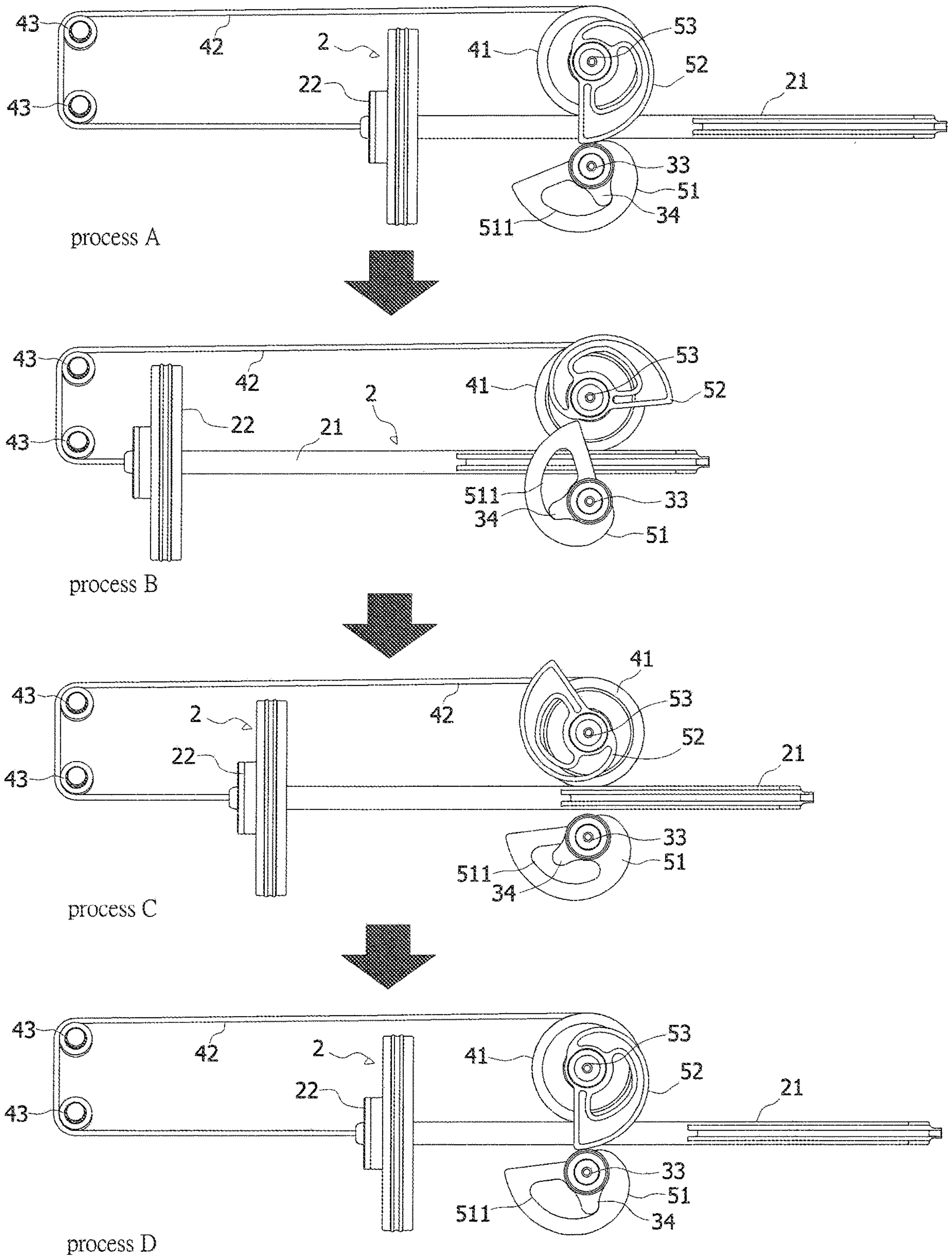
FIG. 8 is the operating state diagram of the present invention.

As shown in FIG. 8, States a, b, c and d correspond to a working cycle, see State a, the impact unit adheres to the position of base where the fastener is driven in, the first output shaft 33 drives the first cam 51 to rotate counterclockwise till it engages with the second cam 52, so that the second cam 52 rotates clockwise, driving the first pulley 41 to rotate clockwise. After the first pulley 41 rotates clockwise for a certain angle, the cord 42 is tensioned, driving the impact unit 2 to move in the first direction, the vacuum is formed. The first output shaft 33 continues rotating, the first cam 51 engages with the second cam 52 continuously till the impact unit reaches maximum stroke in the first direction, the vacuum degree is maximized, see State b. The first output shaft 33 continues to rotate anticlockwise, the first cam 51 is disengaged from the second cam 52 after rotating a certain angle, the impact unit 2 moves at high speed in the second direction under the effect of outside atmosphere, and drives the pushing mechanism 4, the second output shaft and the second cam 52 rotate counterclockwise together, see State c. The arc chute 511 of the first cam 51 and the end of clamp shaft 34 have a certain phantom, when the second cam 52 rotates counterclockwise, there is a counterclockwise acting force on the first cam 51, the first cam 51 is disengaged from the clamp shaft under this force, the counterclockwise rotation is accelerated, so that the first cam 51 is disengaged from the second cam 52 quickly. When the first cam 51 is disengaged from the second cam 52, the impact unit drives the fastener in the nail guide plate into the workpiece (generally wood, metal plate or cement), and drives the pushing mechanism, the second output shaft and the second cam 52 return to initial positions. The first output shaft 33 continues rotating counterclockwise, driving the clamp shaft 34 to reengage with the first cam 41, see State d. The first output shaft 33 continues rotating counterclockwise, driving the first cam 51 to rotate till it reengages with the second cam 52, the working cycle returns to State a.

Figure 9:
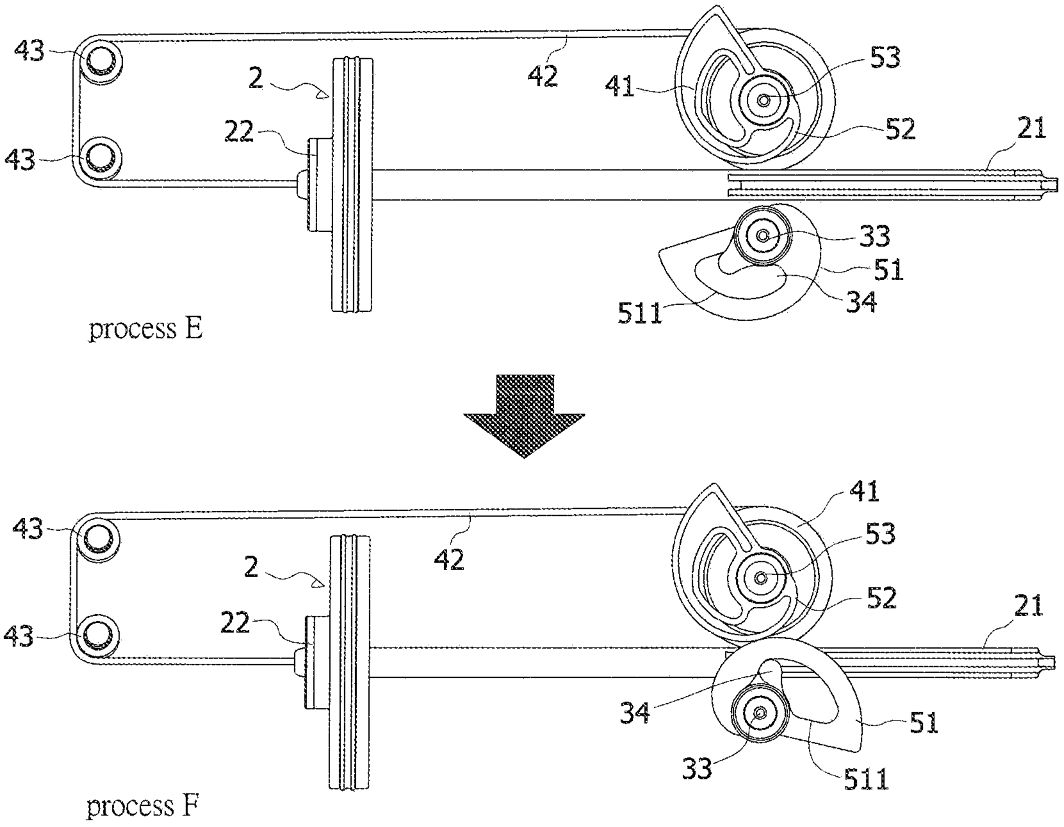
FIG. 9 is the state diagram after nail jamming of the present invention.

As shown in FIG. 9, when nail jamming occurs for some reason, the fastener is stuck in the nail guide plate, the impact unit 2 may stop in any position in the second direction, see State e. As the second cam 52 can engage with the first cam 51 correctly in any position corresponding to the stroke of impact unit 2, when nail jamming occurs, the first output shaft 33 continues rotating counterclockwise, when the clamp shaft 34 reengages with the first cam 51, the counterclockwise rotation continues, driving the first cam 51 to rotate till it reengages with the second cam 52, see State f. The first output shaft continues rotating, the second cam 52 can drive the pushing mechanism 4, so that the impact unit 2 moves in the first direction, the mechanism enters State b of working cycle, so as to enter normal working cycle.

To sum up, in the operation of the present invention, the rotating actuating unit 3 drives the first cam 51 to rotate. When the first cam 51 engages with the second cam 52, the second cam 52 is driven to rotate, so that the pushing mechanism 4 is actuated to drive the impact unit 2 to make the energy storage unit 1 store energy. To be specific, the cord of pushing mechanism pulls the piston of impact unit to move, the piston moves inside the cylinder body, forming vacuum inside the cylinder body, so as to drive the storage unit to store energy. When the first cam 51 rotates till non-engaged state with second cam 52, the second cam 52 cannot provide power for the pushing mechanism 4 anymore, the impact unit rushes out under the effect of the energy released from the energy storage unit, so as to drive the fastener into the workpiece. The pushing mechanism 4 and the second cam 52 work together with the impact unit, meaning the pushing mechanism 4 is not disengaged from the impact unit 2 all the time, and the first cam 51 and the second cam 52 are optionally engaged and disengaged to actuate the pushing mechanism, so that the double-cam mechanism can be engaged correctly in the case of quick release, normal nailing or nail jamming of impact unit, the transmission efficiency can be increased, the quick release of impact unit can be implemented, the operational stability and smoothness of impact unit are guaranteed, the work quality is upgraded, so the present invention has very strong marketability.

I claim:

1. A double-cam fastener driving machine, including an energy storage unit (1) comprising an air spring, a mechanical spring, a rubber element, or a vacuum device;

an impact unit (2) comprising a piston (22) arranged in the energy storage unit (1) and a striker (21) connected to the piston (22), for actuating the energy storage unit (1) to store energy which can bear the energy released from the energy storage unit (1), so as to drive a fastener into a workpiece;

a rotating actuating unit (3);

a pushing mechanism (4) comprising a first pulley (41) fixed to a second output shaft (53), a cord (42) connected to the first pulley (41) and several second pulleys (43) used to guide a direction of the cord (42), connected and linked with the impact unit (2);

a double-cam mechanism (5), including a first cam (51) and second cam (52), wherein the first cam (51) is connected to the rotating actuating unit (3) and driven by the rotating actuating unit (3) to rotate, and the second cam (52) is connected to and interlocked with the pushing mechanism (4);

wherein the rotating actuating unit (3) includes a gear transmission module (31), a motor (32) installed in cooperation with the gear drive module (31), and a first output shaft (33) mounted on the gear transmission module (31) and used to drive the rotation of the first cam;

wherein the first output shaft (33) is fixed with a clamp shaft (34), the first cam (51) is sleeved on the first output shaft (33) in a rotatable manner, and an arc-shaped chute (511) is provided on the first cam (51), into which one end of the clamp shaft (34) extends; the clamp shaft (34) including a base (341) and a cylindrical shaft body (342) formed on one side of the base (341) and perpendicular to the base (341), the base (341) is fixedly sleeved on the first output shaft (33), and the cylindrical shaft body (342) extends vertically from top to bottom into the arc-shaped chute (511).

2. The double-cam fastener driving machine defined in claim 1, wherein the first cam (51) and the second cam (52) can engage with each other at a part of circumferential angle, a rotation motion of the first cam (51) is transformed into a rotation motion of the second cam (52), and a rotation direction is opposite, the first cam (51) and the second cam (52) do not engage with each other at another part of circumferential angle, so as to implement disengagement.

3. The double-cam fastener driving machine defined in claim 2, wherein when the first cam (51) engages with the second cam (52) along a mating surface, a distance between a point of engagement and a spin axis of the first cam (51) increases gradually, and the distance between the point of engagement and the spin axis of the second cam (52) decreases gradually.

4. The double-cam fastener driving machine defined in claim 1, wherein the second cam (52) is fixed to a second output shaft (53); an end of the cord (42) is connected to the impact unit (2) through the several second pulleys (43).

5. The double-cam fastener driving machine defined in claim 1, wherein an end of the cord (42) of the pushing mechanism (4) is connected to a center of back end of the piston (22).

6. The double-cam fastener driving machine defined in claim 1, wherein the piston (22) is arranged in a cylinder body (11), and a periphery of the piston (22) hermetically contacts an inside of the cylinder body (11); the energy storage unit (1) is located between the piston (22) and cylinder body (11), a back end of the cylinder body (11) is provided with a hole site (111) for the cord (42) to pass through.

7. The double-cam fastener driving machine defined in claim 6, wherein the energy storage unit (1) and rotating actuating unit (3) are fixed to a base (6), upper and lower ends of the first output shaft (33) are installed on base (6) through a first bearing (331) and a second bearing (332) respectively, the upper and lower ends of the second output shaft (53) are installed on the base (6) through a third bearing (531) and a fourth bearing (532) respectively, a first bulge (61) and a second bulge (62) are formed at a front end of an upper part of the base (6), the first bearing (331) and the third bearing (531) are installed in the first bulge (61) and the second bulge (62) respectively.

8. The double-cam fastener driving machine defined in claim 1, including a nail guide plate (71) and a nail clip (72) arranged at a lower end of the nail guide plate (71) for delivering fasteners to the nail guide plate (71), the nail guide plate (71) has a channel for the striker (21) of impact unit (2) to pass through.

* * * * *